H. J. SCHMICK.
GEAR CUTTING MACHINE.
APPLICATION FILED NOV. 25, 1914.

1,345,028.

Patented June 29, 1920.
4 SHEETS—SHEET 1.

Inventor
Henry J. Schmick.

Witnesses
Wm. G. Griffin
J. Edward Bangs

By D. J. Reinohl & Son
Attorneys

H. J. SCHMICK.
GEAR CUTTING MACHINE.
APPLICATION FILED NOV. 25, 1914.

1,345,028.

Patented June 29, 1920.
4 SHEETS—SHEET 4.

Witnesses
Wm G. Griffin
J. Edward Bangs

Inventor
Henry J. Schmick.

By D. E. Rinehaldson
Attorneys

UNITED STATES PATENT OFFICE.

HENRY J. SCHMICK, OF LOCK HAVEN, PENNSYLVANIA.

GEAR-CUTTING MACHINE.

1,345,028.

Specification of Letters Patent. Patented June 29, 1920.

Application filed November 25, 1914. Serial No. 873,928.

*To all whom it may concern:*

Be it known that I, HENRY J. SCHMICK, a citizen of the United States, residing at Lock Haven, in the county of Clinton and State of Pennsylvania, have invented certain new and useful Improvements in Gear-Cutting Machines; and I do hereby declare the following to be a full, clear, and exact description of the invention, such as will enable others skilled in the art to which it appertains to make and use the same.

The invention relates to improvements in gear cutting machines.

The primary object of the invention is to provide a machine for cutting gear wheels of various forms in a single cycle of operation.

One of the objects of the invention is to provide a gear cutting machine in which means are provided for continually revolving a cutter head in unison with, and at right angles to a gear-blank so that the thrust of the working contours of the individual cutters is maintained in absolute right-angular relation to the path of peripheral travel of the gear-blank throughout a continuous cycle of operation.

A further object of the invention is to provide a gear cutting machine embodying means for revolving a cutter head in unison with and at right angles to a gear-blank to be cut, means being provided for varying the speed ratio of the cutter head to the gear-blank, or vice versa, whereby to adapt a given size of cutter head for cutting gear-blanks of various diameters.

In carrying out my invention I provide a cutter head of such shape that in any position in its rotation, the part in contact with the gear blank will snugly fit the teeth formed, the blank being timed to rotate in unison with the cutter during the cutting operation.

The invention also comprehends improvements in the details of construction and arrangement of parts which will be hereinafter described and particularly pointed out in the claims.

Referring to the accompanying drawings, in which like characters of reference indicate similar parts in the several views, the machine consists of a bed-plate, A, having a relatively heavy yoke 1, the standards 2—3 of the latter having alined openings adapted to receive split sleeve bearings or brasses 4, in which is supported a power shaft 5, driven by means of a stepped pulley 6, or by any other suitable variable speed means. The rear end of the power shaft 5 is projected beyond the standard 2 of the yoke 1 to receive a removable spur-gear 7, while the forward end of the same is flush with the face of an abutment 8, on the standard 3 of the yoke. Extending longitudinally through the power shaft 5 is a passage 9, preferably rectangular in cross-section, and communicating with the inner extremity of a tapered socket 10 formed in the forward end of the power shaft 5, the purpose of which tapered socket 10 will be hereinafter more fully set forth.

Figures 5, 6, 7, 10, 11:
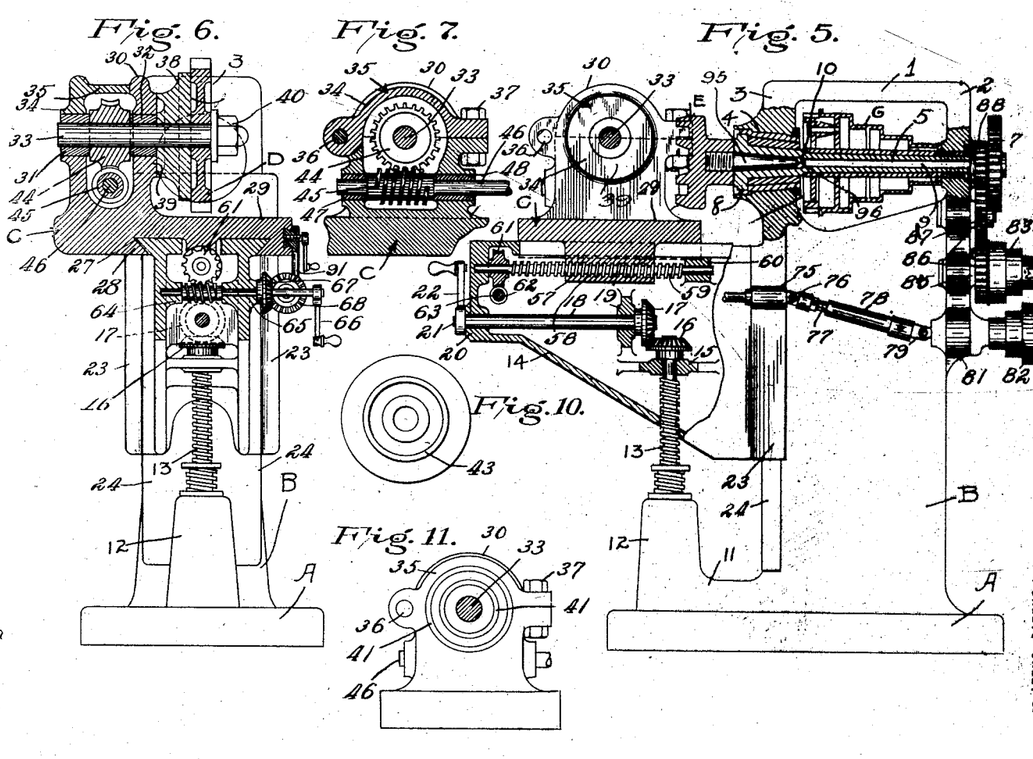
Fig. 5 is a vertical section on the line 5—5 of Fig. 2.
Fig. 6 is a vertical section on the line 6—6 of Fig. 2.
Fig. 7 is a fragmentary vertical section on the line 7—7 of Fig. 2.
Fig. 10 is an end view of the modified bearing face of a work support.
Fig. 11 is a fragmentary end elevation of the modified bearing face of the head.

The forward part of the bed plate A is formed with a raised rib 11 having an upwardly extended portion to provide a base 12 for the reception of the lower end of a screw 13 supporting a vertically movable table 14. For raising and lowering the table 14, the upper end of the screw 13 is passed through a bearing 15, formed integral with the table, and is provided with a bevel-gear 16 arranged in mesh with a second bevel-gear 17 carried on a horizontally disposed shaft 18 supported in bearings 19 and 20, also formed integral with the table. The forward end of the shaft 18 is projected beyond the front wall of the table 14 and terminates in a squared end 21 adapted to receive a crank-handle 22 by means of which movement may be imparted to the screw 13. The table 14 is provided with flanges 23 in sliding engagement with guides 24 arranged at opposite sides of the front face of the body B. A suitable threaded lock 25 is carried by either or both of the flanges 23 and is operable by means of a hand-lever 26 to engage the guides 24 in a manner to immovably sustain the table 14 in any of its elevated positions with respect to the body B. The opposite side edges of the table 14 are formed to provide guides 27 adapted for sliding engagement with the guide-ways 28 of the head C, and which head consists of a base-plate 29 formed with a pair of spaced standards 30, each shaped to provide relatively heavy bearings 31—32 formed as the usual split bearing-sleeves or brasses in which is supported a work shaft 33 disposed at right angles to the power shaft 5. The bearing 31 is provided with a removable upper section 34 integrally formed with a head 35 which overlies the space between the standards 30 and which is suitably hinged at 36 and adapted to be clamped in closed position by a fastening means 37. It is to be noted that the bearings 31—32 and their supporting standards 30 are located at one side of the base-plate 29 which is slightly offset from the longitudinal axis of the machine. On the inner end of the work shaft 33 is placed a work-supporting plate 38, such supporting plates 38 being made in different sizes, each of which is to be used with a corresponding sized gear-blank, snugly contacting the face 39 against which is to be rigidly clamped a gear-blank 5, by means of a securing nut 40. The face 39 of the bearing 32 may be a plane surface, as shown in Fig. 5, or it may be cored to provide a series of rings 41, as illustrated in Fig. 11, to form individual supporting surfaces for the work supporting plates 38 of different diameters, the latter in some instances, being cored to provide a circular flange 43, as shown in Fig. 10, same being adapted to abut the face of a ring 41 of corresponding size on the bearing surface or face 39.

For the purpose of revolving the gear blank D, the work shaft 33 is provided with a gear 44 housed between the standards 30 and arranged in mesh with a worm-gear 45 carried on a stub-shaft 46 mounted in bearings 47—48 formed on the base-plate 29 of the head. The rear end of the stub-shaft 46 terminates in a flexible coupling 49 connecting with a section 50 of a telescopic shaft which has its other section 51 connected by means of a second flexible coupling 52 to a second stub-shaft 53 mounted in a bearing 54 formed on the standard 2 of the yoke 1. A gear 55 is carried by the stub-shaft 53 and is adapted to mesh with the gear 7 mounted on the power shaft 5, both of which gears are removable from their shafts and may be replaced by similar gears of varying diameter combinations for any desired speed ratio between the work-supporting shaft 33 and the power shaft 5, since the proper cutting of the gear teeth 56 on the periphery of a gear-blank by means of a cutter of a given size is dependent upon a predetermined ratio of speed between these shafts, or, in other words, the speed of the work-shaft 33 must be increased or decreased according to an increase or decrease in the diameter of a gear-blank to be cut by a cutter of a given diameter.

For placing the gear-blank in proper position with respect to the cutter E, the head C is moved along the guides 27 of the table 14 by means of a screw shaft 59 in threaded engagement with a depending shoulder 58 formed on the under face of the base plate 29 and supported at its opposite ends in suitable bearings 60. For manually operating the screw-shaft 59, the same is provided with a gear 61 in mesh with a worm-gear 62 carried by a shaft 63 supported at right angles to the screw shaft and at its opposite ends by bearings 64—65, the forward end of the shaft 63 being projected beyond the side wall of the table 14 and formed with a squared end for the reception of a hand-crank 66.

For automatically feeding the head and blank to the cutter during the cutting operation, the shaft 63 is provided with a bevel gear 67 meshing with a second bevel gear 68 mounted on the adjacent end of a shaft-section 69 supported in bearings 70 located on the side wall of the table 14, the other end of the shaft 69 is provided with a clutch element 71 adapted to be engaged by a movable clutch element 72 carried by the adjacent end of a second shaft-section 73 supported in the bearings 74 and 75 on the body B. The rear end of the shaft-section 73 is connected by means of a flexible coupling 76 to a section 77 of a telescopic shaft; the second telescopic section 78 is connected by means of a second flexible coupling 79 to the adjacent end of a stub-shaft 80 mounted in a bearing 81, and having its other end projecting beyond the rear face of the body B to support a stepped pulley 82 adapted to be driven by means of a belt connection (not shown) to a second stepped pulley 83 mounted on a stub-shaft 84 supported in a bearing 85 and which in turn is driven by means of the meshing gears 86, 87, and 88, from the power shaft 5.

For automatically disconnecting the power feed from the head C, the base plate 29 of the head is provided with a groove 89 in which is adjustably mounted a stop 90 which is provided with a depending finger 91 adapted to strike a clutch ring 92 which is pivoted to the table 14 at 93 and which engages the movable clutch member 72 and moves the latter out of engagement with the fixed clutch element 71 when the predetermined feed limit of the head is reached.

It is obvious that the aforesaid telescopic shaft construction admits of continuous drive of the moving parts of the head C throughout the limits of desired movement of the latter and the adjustment of the table with respect to the body.

Figure 8:
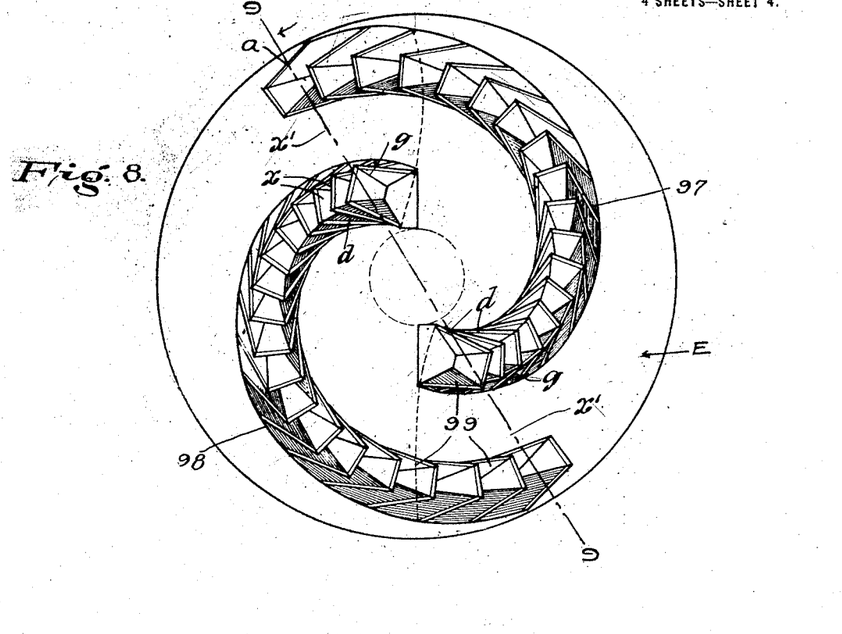
Fig. 8 is a front view of the cutter on a larger scale.
Figure 9:
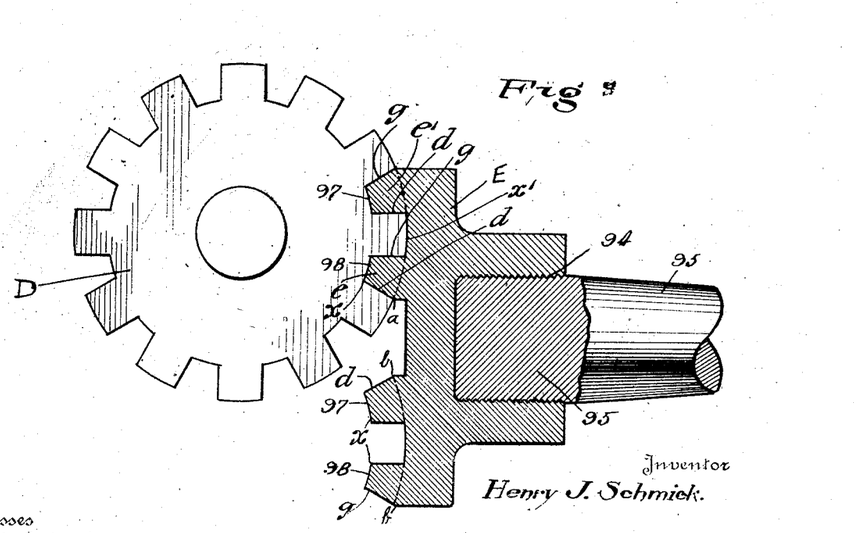
Fig. 9 is a vertical longitudinal section on the line 9—9 of Fig. 8, but illustrating the cutter acting on a gear blank, the gear wheel being about completed.

Referring more paricularly to Figs. 8 and 9 of the drawing, E designates a disk-shaped cutter head having an interiorly threaded socket 94 formed in its rear face to receive the threaded extremity of a tapered shank 95 which is to be inserted into the similarly tapered socket 10 of the power shaft 5, aforementioned, the opposite extremity of the shank 95 terminating in a squared projection 96 adapted for engaging with the passage 9 extending through the power shaft, which passage 9 is provided for the insertion therethrough of a suitable implement or tool (not shown) to jar the tapered shaft 94 loose from the socket 10, when it is desired to remove the cutter from the machine.

The outer face of the cutter head E is provided with a plurality of sets of cutters 97—98, two being shown.

It is important that the cutting edges of the cutters be so shaped and arranged in a curved line with reference to the axis of the disk that the successive cuts made in the blank will be exactly an equal distance apart to produce finished parallel gear teeth of equal depth. The body of each cutter is arranged at a different angle from that of the adjacent cutter. That is the cutter at the root of the curved line of each set inclines outwardly toward the circumference of the disk, and the inclination of the succeeding cutters gradually changes in a direction toward the center of said disk, until the inclination of the respective bodies of the outermost cutters becomes reversed with reference to the innermost cutters.

By this change of inclination of the cutters in each set, the inner cutting edges $d$, of the innermost cutters will cut one wall of a tooth $e$, on the blank as the latter approaches a horizontal line $f$, (Fig. 9) while the outer cutting edges $g$ of the same cutters act to form the opposite surface of the adjacent tooth $e$, the latter surface at this time being at right angles to the face of the disk, as will be seen by reference to Fig. 9. Of course the successive changing inclination of the outer cutting edges $d$ and $g$ act to cut the walls of the gear teeth as the blank advances with reference to the horizontal line $f$. For instance, the cutting edges $g$, at the root of the curve cut on a line substantially parallel with the axis of the disk E, and the gradually increasing angularity of the edges $g$ will, when forming a gear wheel, cut on a line parallel with the radius of the gear blank, as shown in Fig. 9. The same cutting action takes place with reference to the cutting edges $d$, consequently in any position of the cutters and the blank, when in cutting position, the angularity of the cutting edges $d$ and $g$ will cause them to cut on lines parallel with the radius of the gear blank, the blank, of course, being disposed at right angles to the cutting disk. The ends of the two sets of cutters, as shown, are spaced apart equal to the thickness of one tooth, the outer end of one set overlapping the inner end of the companion set, so that in each revolution of the cutting disk there are two periods when both sets of cutters act on the blank, as shown in Fig. 9. Hence the cutting edges of the companion set of cutters act to cut on an inclined line as described with reference to cutters $d$, while the corresponding edges $d$, of the same cutters act to cut on a line parallel with the axis of the cutter head, as previously described with reference to the cutting edges $g$, but of course these cutters are cutting on another tooth indicated at $e'$.

It is essential at this time to understand that each set of cutters is laid out on a curve which progressively engages the blank and the teeth formed therein, each cutter being so positioned and shaped to cut on a line parallel with the radius of the blank. By changing the angularity of the cutting edges $d$ and $g$, the surfaces cut on the blank in the formation of the teeth can be changed, this being largely a matter of design and shaping of the cutters.

The curved line arrangement of each set of cutters cannot well be defined, except to state that its base is formed on several arcs struck from as many centers, and the cutting edges are made and shaped to cut into the blank to form parallel teeth. While the curved line arrangement of the cutters is not, strictly speaking, a spiral, it more nearly approaches this term, and therefore for clearness, the term "spiralistic" will be employed in the claims to designate this feature.

In addition to the inclination of the side edges of the cutters, to form the walls of the teeth, the forward or front edges $x$ of the cutters incline with reference to the face of the disk, and they are also dished or curved to form the bottom walls of the spaces between the gear teeth, and the surface $x'$ between and adjacent the sets of cutters is formed on an arc struck from the center of the blank. The front faces $w$ of the cutters, are curved in cross section to correspond to the peripheral surface at the bottom of the spaces between the gear teeth, and because of the curvature of the sets of cutters, and the constantly changing position of the gear blank in its rotation, it is absolutely necessary that this curvature vary with respect to the various cutters.

This can best be appreciated by referring to the diagram (Fig. 12) which illustrates the development of one set of cutters drawn out. In this figure, $k$ indicates the inner end of one set of cutters, and $l$ is the outer end. The inner edges of the cutters are indicated at $m$, and the outer edges at $n$. The inner edges of the cutters incline downwardly from the point $m$ to a point $o$, while the outer edges incline upwardly from the point $n$, at the inner end to a point $o'$ at the outer end. The two inclinations of the respective edges are reversed and cross each other at about the point $p$.

Figure 1:
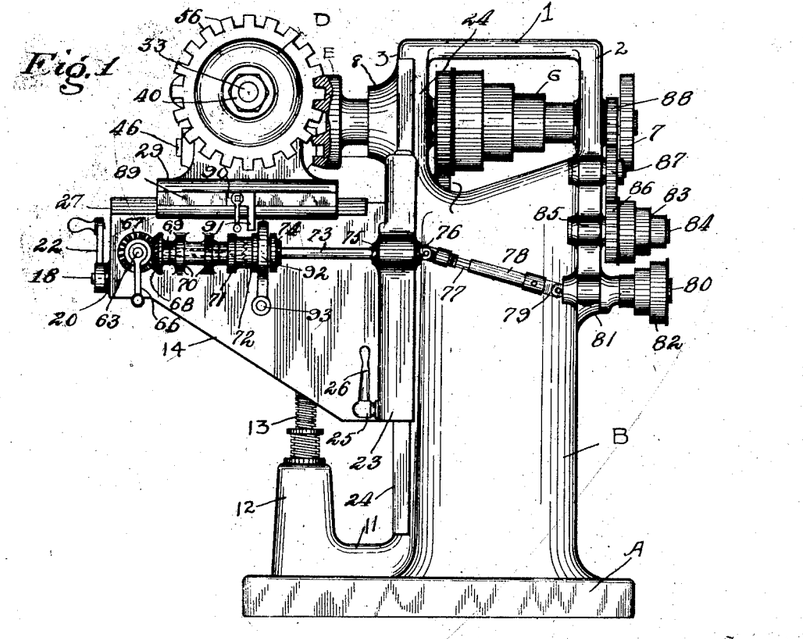
Figure 1 is a side elevation of the preferred embodiment of the invention.
Figure 2:
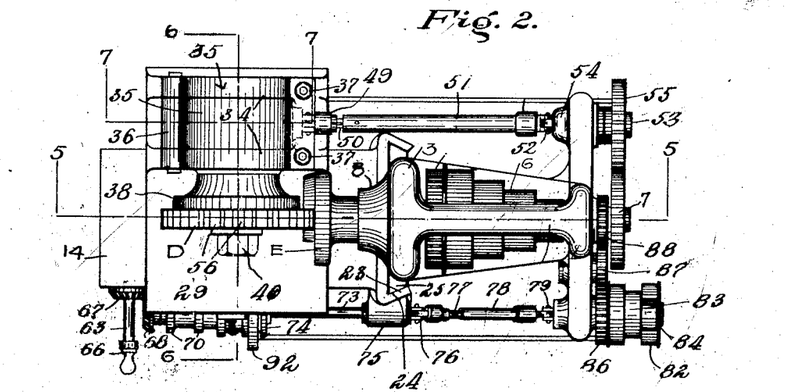
Fig. 2 is a top plan view of the same.
Figures 3, 4, 12, 13, 14, 15:
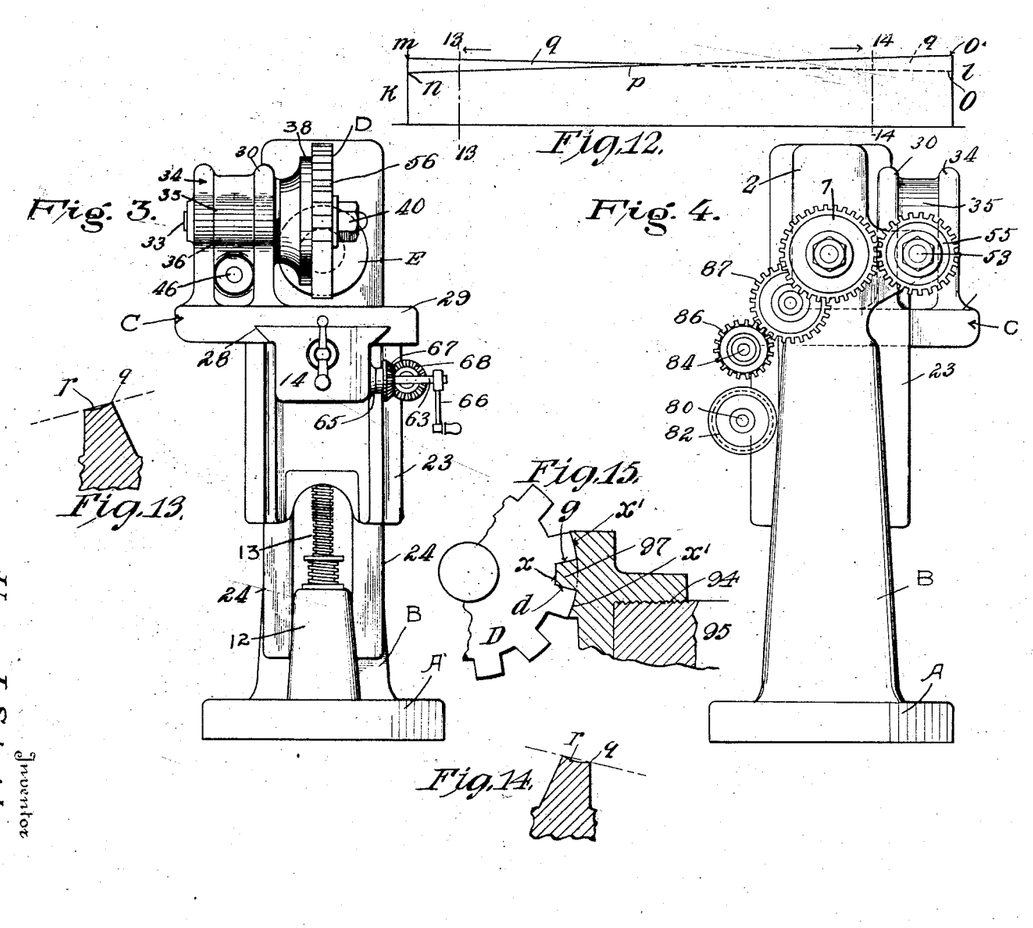
Fig. 3 is a front elevation.
Fig. 4 is a rear elevation.
Fig. 12 is a diagram showing the development of one set of cutters.
Fig. 13 is a diagrammatic section on the line 13—13 of Fig. 12.
Fig. 14 is a similar view on the line 14—14 of Fig. 12.
Fig. 15 is a view similar to Fig. 9, but illustrating the cutting element rotated a quarter turn.

The front face $g$, formed between the two inclined edges inclines radially in opposite directions from the point $p$, as shown in Figs. 13 and 14, the two inclinations gradually increasing from point $p$, toward the ends, as shown. In addition to the front face of the cutters inclining in opposite directions, they are dished on an arc struck from the center of the gear blank to cut between the teeth, as shown at $r$.

It is to be noted that the opposite ends $m$, $o$ and $n$, $o'$ of each set of cutters are exactly the same distance from the face of the disk, consequently when the two overlapping sets are acting on a blank the proper angles will be presented to form the teeth.

It is thought that the purpose of varying the angular faces of the cutters will be appreciated. From Fig. 9 it will be seen that the angular faces of the cutters snugly fit in and correspond with the gear teeth on the blank when the two overlapping sets of cutters are operating. In the instance shown, the greatest diameter of one set of cutters, and the smaller diameter of the companion set of cutters are shown as engaging with the blank, the two sets of cutters acting simultaneously to form the teeth. Now let it be assumed that the disk has made about a quarter turn, or the point $p$ in the diagram is in cutting position as shown in Fig. 15. In this instance but one set of cutters is acting on the blank. It is evident however that the cutting action and unison of movement of the cutters and blank, when the disk is in this position is exactly the same as when the parts are in the position shown in Fig. 9.

It is to be fully understood that the cutter head E may be of any desired diameter and that the curved formation of the cutters may be increased or decreased in suitable proportions to conform to any of such diameters as may be required without departing from the spirit of the invention.

From the foregoing description it will be seen that I have provided a gear cutting machine which will produce a completed gear wheel without further finishing.

By adjusting the blank on its support to change the peripheral face with reference to the center of the cutting disk, the angular arrangement of the teeth can be altered, and as stated, by changing the timing gears the number of teeth cut in the gear blank can likewise be changed.

I am aware it is old in the art to form partially completed gears of various styles by rotating the cutter and the blank, but I am not aware of it being old to form in a single operation a completed gear wheel by disposing the gear blank at right angles to a cutter projecting axially from a disk and so shaped as to cut teeth of even depth on the blank and rotate the blank and cutters continuously and in unison.

What is claimed is:—

1. In a gear cutting machine, the combination of a cutter head having a plurality of cutters projecting from one face thereof, said cutters being arranged in a curved line, each succeeding cutter being located a greater distance from the center of the cutter head, each succeeding cutter having its sides arranged at different angles, a gear blank holder having its axis at right angles to the axis of the cutter head to present the periphery of a gear blank at right angles to the said cutter head, means for continuously rotating the gear blank holder and the cutter head in unison, and means for creating continuous relative movement before the cutter movement and the gear blank holder during the cutting operation.

2. In a gear cutting machine, the combination of a cutter head having a plurality of spiralistically arranged cutters on one face thereof, each succeeding cutter having its sides cut at a different angle, a gear blank holder having its axis at right angles to the axis of the cutter head, means for continuously rotating the blank holder and the cutter head in unison, and means for constantly moving the gear blank holder toward the cutter head during the entire cutting operation.

3. In a gear cutting machine, the combination of a longitudinal power shaft, a cutter head carried by the power shaft, said cutter head having a plurality of cutters on its face, the side edges of each succeeding cutter being at different angles, a gear blank supporting shaft having its axis at right angles to the axis of the power shaft to support a gear blank at right angles to the cutter head, means for adjusting the work shaft relative to the power shaft, means for manually or automatically moving the gear blank support toward the cutters during the entire cutting operation, and means for varying the speed ratio between the power shaft and the work shaft.

4. In a gear cutting machine, the combination of a cutter head provided with a plurality of axially disposed cutters on its front face disposed in a curved line, each succeeding cutter being arranged at a different angle and the side edges of each succeeding cutter being at different angles, a gear blank supporting shaft having its axis at right angles to the cutter head to present the periphery of a gear blank to the axis of the cutters, means for rotating the cutter head and gear blank support in unison, and means for creating constant relative movement between the cutter head and the gear blank supporting shaft at the time of cutting teeth in the blank.

5. In a gear cutting machine, the combination of a cutter head having on one face thereof a plurality of spiralistically arranged cutters, the faces of the succeeding cutters being at different angles and the side edges of each succeeding cutter being at different angles, a gear blank holder having its axis at right angles to the cutter head, means for continuously rotating the blank holder and the cutter head in unison, and means for creating constant relative movement between the cutter head and the blank holder at the time of cutting teeth on the blank.

6. In a gear cutting machine, the combination of a cutter head having on one face thereof two sets of spiralistically arranged cutters the side edges of each succeeding cutter being of different angles, one set of cutters overlapping the other, a gear blank holder having its axis at right angles to the axis of the cutter head, means for constantly and uniformly moving the gear blank holder in direction of the face of the cutter head, and means for rotating the cutter head and the gear blank holder in unison during the cutting operation.

7. In a gear cutting machine, the combination of a cutter head having on one face thereof two sets of spiralistically arranged cutters, the inside edges of the cutters at the root of the curve being of a greater angle than the angle of the edges of the cutters at the outer end of the curve, and the angle of the outside edges of the cutters being the greatest at the outer end of the curve, one set of cutters overlapping the other, a gear blank holder having its axis at right angles to the axis of the cutter head, means for rotating the cutter head and the gear blank holder continuously and in unison, and means for creating constant relative movement between the gear blank holder and the cutter head during the time of cutting teeth on the blank.

8. In a gear cutting machine, the combination of a power shaft, a cutter head carried by said power shaft and provided on one face with a plurality of axially disposed cutters arranged in a curved line, the side edges of each cutter being at a different angle, each succeeding cutter being arranged at a different angle, a vertically adjustable table mounted to be moved vertically toward and from the cutter head, a gear blank support mounted on the table and having its axis at right angles to the axis of the cutter head, and means for constantly rotating the gear blank support and the cutter head in unison.

9. In a gear cutting machine, the combination of a power shaft, a cutter head carried by said power shaft and provided on one face with a plurality of axially disposed cutters arranged in a curved line, the side edges of the cutters being angularly disposed and progressively varying in angularity, a vertically adjustable table mounted to be moved vertically toward and from the cutter head, a gear blank support mounted on the table and having its axis at right angles to the axis of the cutter head, means for constantly rotating the gear blank support and the cutter head in unison, means for creating constant relative movement between the cutter head and the gear blank support, and means for varying the speed ratio between the gear blank holder and the cutter head.

10. In a gear cutting machine, the combination of a shaft, a cutter head mounted on the shaft and provided on its front face with a set of axially disposed cutters, each arranged at a different angle and in a curved line to provide on opposite sides of the cutters opposite inclined cutting edges which gradually increase in inclination toward opposite ends of the set of cutters, a gear blank support having its axis at right angles to the axis of the cutter head, and means for constantly rotating the cutter head and the gear blank support in unison.

11. In a gear cutting machine, the combination of a shaft, a cutter head carried by said shaft and provided on one face with a plurality of axially disposed cutters arranged in a curved line, the side edges of each cutter being at different angles, and the side edges of each succeeding cutter being at different angles, a vertically adjustable table movable vertically toward and from the cutter head, a support mounted on the table, means for moving the support longitudinally of the cutter head, a gear blank supporting shaft mounted on the support with its axis at right angles to the axis of the cutter head, means for varying the speed ratio between the gear blank support and the cutter head, and means for constantly creating relative movement between the gear blank support and cutter head during the cutting operation.

12. In a gear cutting machine, the combination of a cutter head provided on one face with a plurality of cutters, a table vertically adjustable toward and from the cutter head, a support on the table movable longitudinally of the cutter head, a gear blank support mounted on the first mentioned support and having its axis at right angles to the axis of the cutter head to hold a blank in position to cause its periphery to be normally located to engage the face of the cutter head between the axis and the circumference of the latter, manual means for moving the support and the gear blank support longitudinally of the cutter head, means for constantly rotating the gear blank support and the cutter head in unison in one direction only to cut teeth on the periphery of the blank, and means for constantly creating relative movement in one direction only between the gear blank support and the cutter head, the constant relative movement being of uniform speed throughout the entire operation of cutting all the teeth on the blank.

13. In a gear cutting machine, the combination of a cutter head provided on one face with a plurality of cutters arranged in a curved line, a gear blank support having its axis at right angles to the axis of the cutter head to hold a blank in position to cause its periphery to be normally located to engage the face of the cutter head between the axis and the circumference of the latter, means for rotating the gear blank support and cutter head in unison in one direction only to cut teeth on the blank, means for constantly creating relative movement in one direction only between the gear blank support and the cutter head, means for automatically stopping the rotation of the gear blank support and cutter head at a predetermined time, and means for changing the speed ratio between the cutter head and the gear blank support.

14. In a gear cutting machine, the combination of a cutter head provided on one face with a set of cutters disposed at an angle to each other and in a curved line to provide a plurality of side cutting edges of gradually increasing angularity from opposite ends of the set of cutters, the forward cutting edges of the successive cutters to a point intermediate the length of the set being inclined downwardly toward the head, and the forward edges of the remaining cutters the other side of the intermediate point in the length of the set inclining downwardly toward the center of the head, a gear blank support having its axis at right angles to the cutter head, and means for constantly rotating the gear blank support and the cutter head in unison.

15. In a gear cutting machine, the combination of a cutter head provided on one face with a set of cutters arranged in a curved line, the forward edges of the cutters at one end of the set inclining in one direction to a point intermediate the length of said set of cutters and the edges of the remaining cutters being inclined in the opposite direction, a gear blank support having its axis at right angles to the cutter head, and means for constantly rotating the cutter head and the gear blank support in unison.

16. In a gear cutting machine, the combination of a cutter head provided on one face with a set of cutters arranged in a curved line, the forward edges of the cutters at one end of the set being curved and inclined in one direction to a point intermediate the length of said set of cutters and the edges of the remaining cutters being curved and inclined in the opposite direction, a gear blank support having its axis at right angles to the cutter head, and means for constantly rotating the cutter head and the gear blank in unison.

17. In a gear cutting machine, the combination of a cutter head having on one face two sets of cutters, the cutters of each set being arranged at a different angle, one to the other and in a curved line, the ends of the two sets of cutters overlapping, the angularity of the outer cutting edges of each curved set of cutters increasing from the inner end of the curved line toward the outer end thereof, and the inner cutting edges of each set of cutters increasing in angularity from the outer end of the curved line to the inner end thereof, a gear blank support having its axis at right angles to the cutter head, and means for continuously rotating the cutter head and the gear blank support in unison.

18. In a gear cutting machine, the combination of a cutter head provided on one face with a plurality of outwardly projecting cutters arranged in a curved line produced on several different arcs, the angular edges of each succeeding cutter differing and the inclination of the face of each successive cutter differing, a gear blank holder having its axis at right angles to the axis of the cutter head to hold the periphery of a gear blank in the presence of the cutters, means for continuously rotating the gear blank holder and the cutter head in unison, and means for creating constant relative movement between the gear blank holder and the cutter head during the cutting operation.

19. In a gear cutting machine, the combination of a cutter head provided on one face with a plurality of axially disposed cutters arranged in a curved path, the forward cutting edges of the respective cutters being at a different angle with reference to the face of the cutter head, a gear blank holder having its axis at right angles to the axis of the cutter head to hold the periphery of a gear blank in the path of the cutters, and means for continuously rotating the cutter blank holder and the cutter head in unison.

20. In a gear cutting machine, the combination of a cutter head having two sets of axially disposed cutters projecting from one face thereof, each set of cutters being arranged in a curved line and each succeeding cutter of each set being located a greater distance from the center of the cutter head, the two sets of cutters overlapping and spaced apart at the ends, a gear blank having its axis holder at right angles to the axis of the cutter head to present a gear blank at right angles to the said cutter head, and means for continuously rotating the gear blank holder and the cutter head in unison.

21. In a gear cutting machine, the combination of a cutter head having on one face a plurality of cutters so shaped and arranged as to cut finished parallel teeth in a gear blank, a gear blank holder having its axis at right angles to the axis of the cutter head to support a gear blank at right angles to the cutter head, means for continuously rotating the cutter head and the gear blank holder at a uniform rate of speed during the cutting operation, and means for continuously advancing the gear blank toward the cutters during the cutting operation.

22. In a gear cutting machine, the combination of two rotating elements one carrying a plurality of cutters and the other carrying a blank on which the cutters operate, the angles of the side edges of each successive cutter differing, means for continuously rotating each of the elements in unison at a uniform speed during the cutting operation, means for creating constant relative movement between the two elements during the cutting operation, means for raising and lowering the element carrying the blank, and means for changing the speed ratio between the two elements.

23. In a gear cutting machine the combination of a rotating cutter element and a rotating blank element, the axes of said elements being at right angles to each other and one being in advance of the other to cause the periphery of one element to at all times engage the face of the other element between the axis and the circumference of the latter element, means for continuously rotating the two elements in unison, the speed of each element remaining identically the same from the beginning to the end of the cutting operation, and each continuing to rotate in one direction during the cutting operation, and means for creating constant uniform relative movement between the two elements during the cutting operation, the uniform relative movement being at all times parallel to the axis of one of the elements.

24. In a gear cutting machine, the combination of a shaft, a cutter head mounted on the end of the shaft, the front face of the cutter head having two sets of overlapping spiralistic cutters, each succeeding cutter being at a different angle, and the opposite edges of each succeeding cutter being at different angles, a vertically adjustable table, a bearing mounted to slide in the table, a gear blank rotatably mounted in the bearing and adapted to carry a gear blank, the axes of the two shafts being arranged at right angles to each other, means for continually rotating the gear blank support and the cutter head in unison, and simultaneously sliding the gear blank support toward the face of the cutter head during the cutting operation, and means for automatically stopping the sliding movement when the teeth are cut a predetermined depth.

25. In a gear cutting machine, the combination of a frame, a shaft mounted in the frame, a cutter head mounted on the frame, said cutter head having two sets of spiralistic overlapping cutters on its front face, each succeeding cutter having its front face differently curved and its edges of different angles, a vertically adjustable table on the front of the frame, means for vertically adjusting the table, a slidable bearing mounted on the table and provided with a bearing, a screw shaft for sliding the support toward and from the cutter head, gearing for rotating the screw shaft, a gear blank shaft mounted in the bearing, gearing for constantly rotating the two shafts in unison and simultaneously sliding the support to force a gear blank against the cutters while same are rotating, and automatic means for stopping the sliding movement when the teeth have been cut a predetermined depth.

26. In a gear cutting machine, the combination of two rotating shafts, one carrying a cutter head provided with a plurality of cutters and the other carrying a gear blank, means for constantly rotating the two shafts in unison, means for constantly sliding one of the shafts toward the other to cause the cutters to cut while the two shafts are rotating, means for automatically stopping the sliding movement when teeth of predetermined depth have been cut, and means for vertically adjusting one of the shafts to position a blank adjacent the cutter.

27. In a gear cutting machine, the combination of a shaft, a cutter head mounted on the end of the shaft and provided on its front face with a plurality of cutters, a shaft having its axis at right angles to the axis of the first mentioned shaft and disposed out of axial alinement therewith and adapted to support a gear blank, means for constantly rotating the two shafts in unison, and simultaneously constantly moving the shaft carrying the gear blank in direction of the cutters during the cutting operation.

28. In a gear cutting machine, the combination of a cutter head provided on its front face with a plurality of spiralistic cutters, each having differing angular side edges and curvature on its front face, a gear blank support having its axis at right angles to the axis of the cutter head and disposed out of axial alinement therewith, and means for constantly rotating the cutter head and gear blank support in unison and simultaneously moving the gear blank toward the cutters during the cutting operation.

29. In a gear cutting machine, the combination of a cutter head having two sets of cutters, each arranged in a curved line and each overlapping the other and spaced apart, a gear blank holder having its axis at right angles to the axis of the cutter head, the axis of the gear blank holder being disposed to locate the periphery of a blank in engagement with the cutters between the axis of the cutter head and the circumference thereof when the cutters are in cutting engagement with the blank, and means for constantly rotating the cutter head and gear blank holder, and simultaneously moving the gear blank to the cutters during the cutting operation.

30. In a gear cutting machine, the combination of two rotating shafts having their axes disposed at right angles to each other, a cutter head mounted on one of the shafts and provided on its front face with a plurality of cutters, a gear blank holder mounted on the other shaft and adapted to support a blank to present the periphery of the latter in engagement with the face of the cutter head between the axis and the circumference of the latter, the shafts being disposed out of axial alinement with each other, and means for simultaneously rotating the two shafts in unison, and constantly moving the shaft carrying the blank at right angles to the cutter head to cause the cutters to constantly cut into the blank.

31. In a gear cutting machine, the combination of a cutter head having a series of spiralistically arranged cutters on its front face, the faces of the cutters at opposite ends of the series inclining in opposite directions with reference to the axis of the cutter head and the faces of the intervening cutters gradually changing from one inclination to the other toward the respective ends of the series, a gear blank holder adapted to support a gear blank, and means for constantly rotating the cutter head and the gear blank holder and simultaneously constantly moving the gear blank holder toward the cutters.

32. The method of cutting a gear or wheel which consists in moving a plurality of tools in a curved path in a plane substantially tangent to the pitch surface of the gear to be produced and imparting a continuous indexing movement to the blank whereby it is indexed between the operations of successive tools.

33. The method of cutting a gear or wheel which consists in moving a plurality of tools in the same circular path in a plane substantially tangent to the pitch surface of the gear to be produced and imparting a continuous indexing movement to the blank.

34. In a machine for cutting curved teeth, the combination with a blank carrier, of a rotary tool head, a plurality of tools arranged on the tool head and movable in a curved path in a plane substantially tangent to the pitch surface of the gear to be produced from the blank, the tools having engagement with different teeth on the blank during a single revolution of the tool head, and means for producing a continuous indexing movement of the blank.

35. The method of cutting gear teeth, which consists in moving a plurality of cutters in engagement with a continuously indexed blank and in a path tangential to the pitch surface of said blank, so that a plurality of said cutters act to cut different teeth on the blank in a single rotation of the cutter head.

36. In a machine for cutting gear teeth, the combination with a rotary blank carrier, of a rotary cutter head, a plurality of cutters arranged on the head and movable across the face of the blank in a curved path and in a plane substantially tangential to the pitch surface of the blank, and means for continuously indexing the blank, the cutters having operative engagement with different teeth during a single revolution of the head.

In testimony whereof I affix my signature, in presence of two witnesses.

HENRY J. SCHMICK.

Witnesses:
D. C. REINOHL,
W. PARKER REINOHL.